(12) United States Patent
Sawada

(10) Patent No.: US 11,003,405 B2
(45) Date of Patent: May 11, 2021

(54) CONTROL METHOD AND PRINTING CONTROL APPARATUS

(71) Applicant: CANON KABUSHIKI KAISHA, Tokyo (JP)

(72) Inventor: Hideharu Sawada, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/794,346

(22) Filed: Feb. 19, 2020

(65) Prior Publication Data

US 2020/0272384 A1 Aug. 27, 2020

(30) Foreign Application Priority Data

Feb. 27, 2019 (JP) .............................. JP2019-034741

(51) Int. Cl.
*G06F 3/12* (2006.01)
(52) U.S. Cl.
CPC .......... *G06F 3/1251* (2013.01); *G06F 3/1208* (2013.01); *G06F 3/1256* (2013.01)
(58) Field of Classification Search
CPC ..... G06F 3/1251; G06F 3/1256; G06F 3/1208
USPC ................................................. 358/1.6, 1.16
See application file for complete search history.

(56) References Cited

U.S. PATENT DOCUMENTS

| | | | |
|---|---|---|---|
| 8,363,237 B1 * | 1/2013 | Withington | G06F 3/1285 358/1.13 |
| 9,135,537 B2 | 9/2015 | Sawada | |
| 9,665,326 B2 | 5/2017 | Nouda et al. | |
| 2004/0239959 A1 | 12/2004 | Yada et al. | |
| 2006/0197964 A1 | 9/2006 | Kasuga | |
| 2011/0242559 A1 * | 10/2011 | Takeuchi | H04N 1/2307 358/1.9 |

FOREIGN PATENT DOCUMENTS

| | | |
|---|---|---|
| JP | 2007-156630 A | 6/2007 |
| JP | 2008-254330 A | 10/2008 |

OTHER PUBLICATIONS

European Search Report dated Jul. 1, 2020, in related European Patent Application No. 20157384.7.

* cited by examiner

*Primary Examiner* — Tammy Paige Goddard
*Assistant Examiner* — Darryl V Dottin
(74) *Attorney, Agent, or Firm* — Venable LLP

(57) ABSTRACT

A printing control apparatus displays a setting screen capable of accepting a user instruction for selectively instructing a first printing that indicates four-side borderless printing that makes no margin on both sides in a widthwise direction of the recording medium and makes, by cutting the recording medium, no margin on both sides in a lengthwise direction, and a second printing mode that indicates three-side borderless printing that makes a margin on one side in the widthwise direction of the recording medium and no margin on another side in the widthwise direction and makes, by cutting the recording medium, no margin on both sides in the lengthwise direction of the recording medium. In the first printing mode, a first print setting is not able to be set by a user, and in the second printing mode, the first print setting is able to be set by a user.

18 Claims, 12 Drawing Sheets

FIG. 1
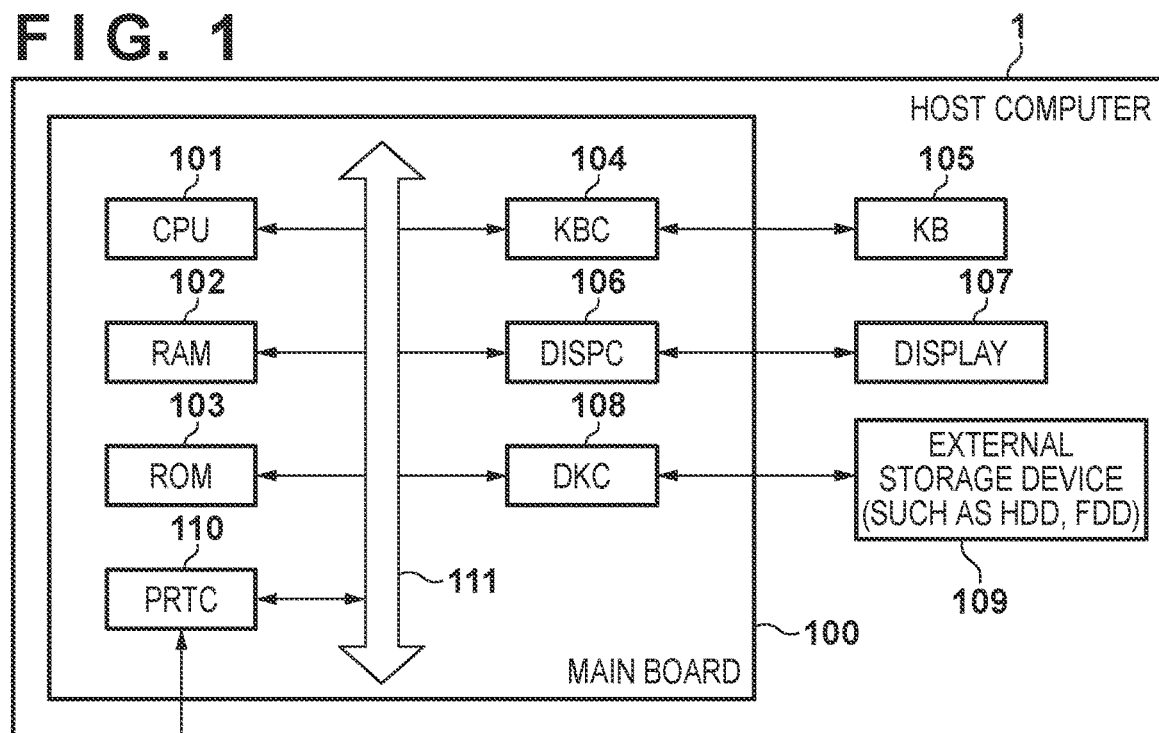
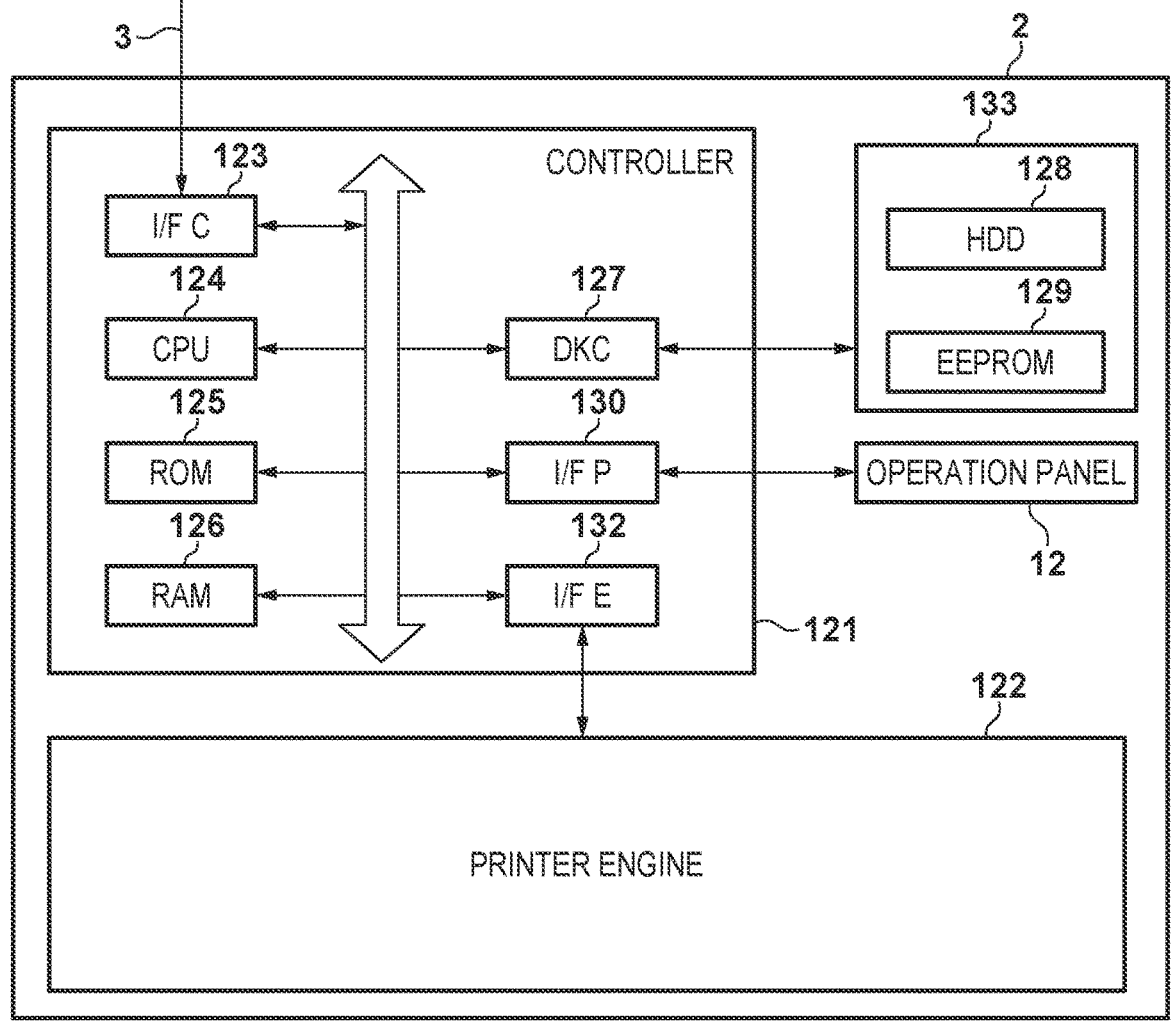

F I G. 6

| SHEET SIZE | WIDTH | LENGTH |
|---|---|---|
| ISO B3 | 3530 | 5000 |
| ISO B4 | 2500 | 3530 |
| ISO A3 | 2970 | 4200 |
| ISO A4 | 2100 | 2970 |
| ... | ... | ... |

F I G. 7

| POSSIBLE BORDERLESS WIDTH |
|---|
| 2970 |
| 3290 |
| 4200 |
| 5000 |
| ... |

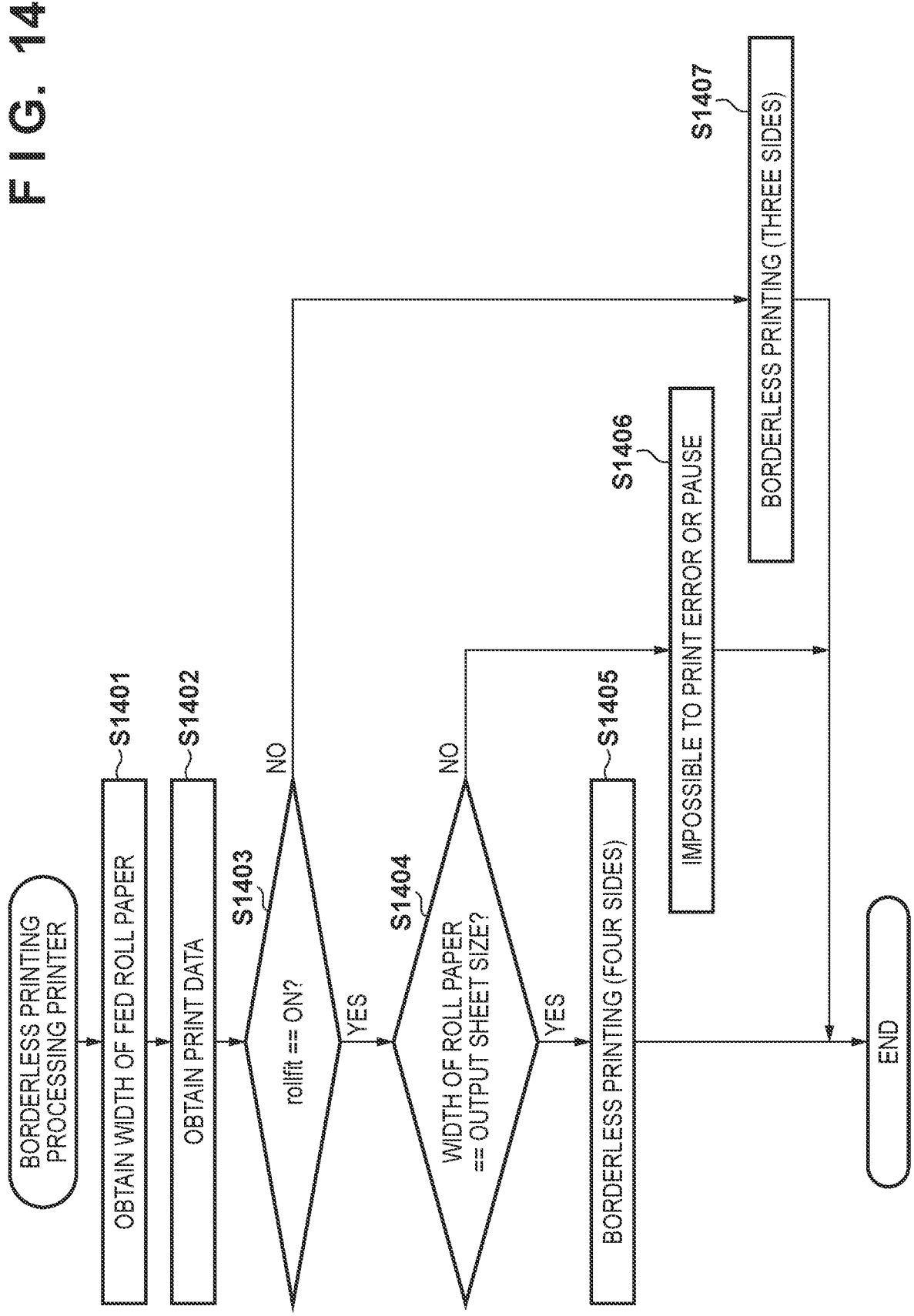

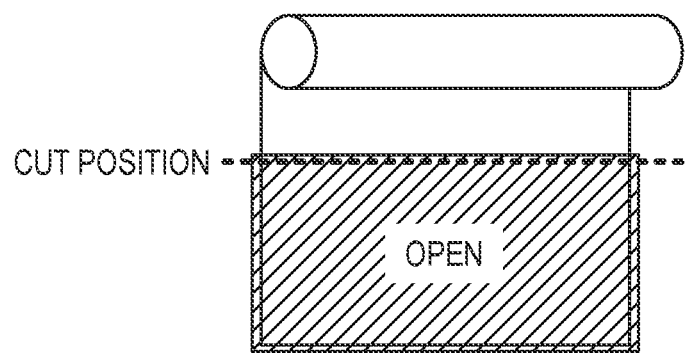
F I G. 15A
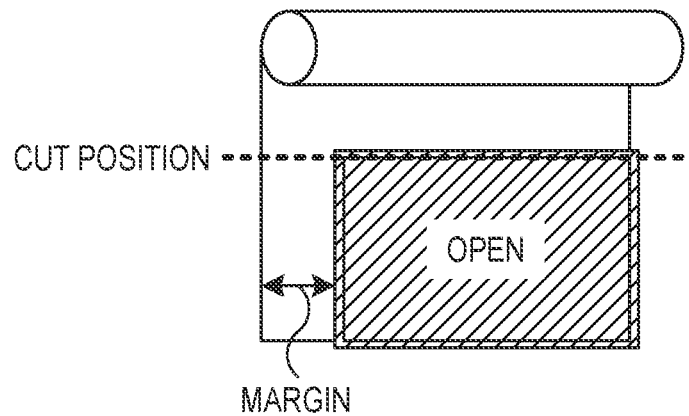
F I G. 15B

CONTROL METHOD AND PRINTING CONTROL APPARATUS

BACKGROUND OF THE INVENTION

Field of the Invention

The present invention relates to a print setting technique that enables the use of borderless printing.

Description of the Related Art

A technique of performing borderless printing in large-sized printers is known (see Japanese Patent Laid-Open No. 2007-156630).

SUMMARY OF THE INVENTION

The present invention provides a technique of improving convenience in borderless printing.

According to one aspect of the present invention, there is provided a control method executed by a printing control apparatus, the method comprising: displaying a setting screen, and accepting, on the setting screen, selection of either of a first printing mode of executing printing on a roll-like recording medium so as to have no margins on both ends of the roll-like recording medium in a widthwise direction and a second printing mode of executing printing on the roll-like recording medium so as to have a margin on one end of the roll-like recording medium in the widthwise direction and no margin on the other end, wherein if the selection of the second printing mode is accepted, a print setting that cannot be set in the first printing mode can be set.

Further features of the present invention will become apparent from the following description of exemplary embodiments (with reference to the attached drawings).

BRIEF DESCRIPTION OF THE DRAWINGS

FIG. 1 is a block diagram showing an example of a system configuration;

FIG. 6 is a table showing an example of a sheet size list;

FIG. 7 is a table showing an example of a possible borderless width list;

FIG. 14 is a flowchart showing an example of a processing procedure in the printer main body; and FIGS. 15A and 15B are views respectively showing four-side borderless printing and three-side borderless printing.

DESCRIPTION OF THE EMBODIMENTS

Figure 2:
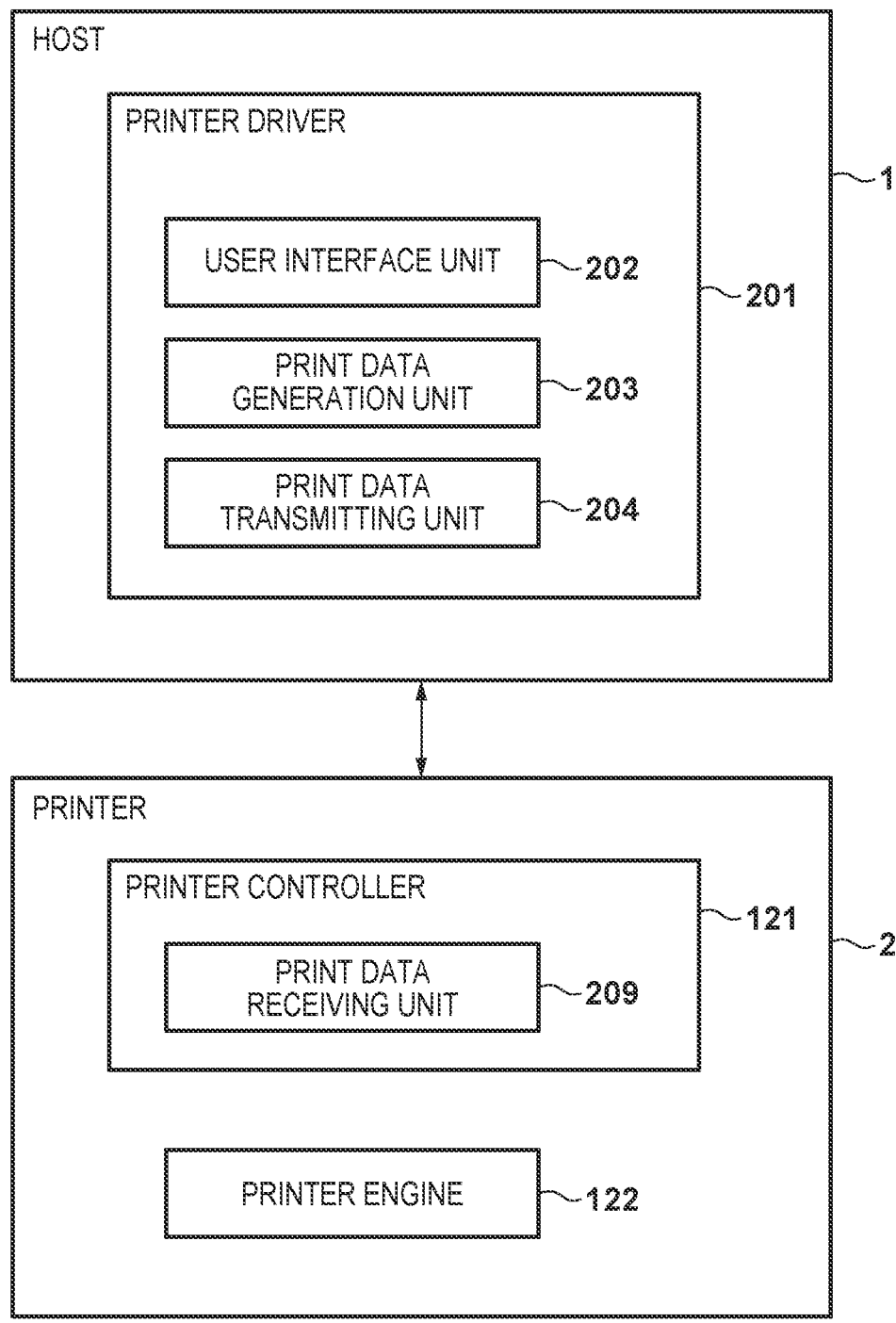
FIG. 2 is a functional block diagram showing an example of the functional configuration of each apparatus.

Hereinafter, embodiments will be described in detail with reference to the attached drawings. Note, the following embodiments are not intended to limit the scope of the claimed invention. Multiple features are described in the embodiments, but limitation is not made in an invention that requires all such features, and multiple such features may be combined as appropriate. Furthermore, in the attached drawings, the same reference numerals are given to the same or similar configurations, and redundant description thereof is omitted.

This embodiment will exemplify a borderless printing technique in a large-size printer. In borderless printing, the printer receives print data of an image slightly larger than a sheet size from a printer driver. The printer then executes printing based on this print data to also discharge ink to a portion slightly protruding from an end of the sheet. This makes it possible to obtain a print result (printout) having an image provided up to the end of the sheet without any white border (to be also simply referred to as "border" hereinafter) as a margin on the end of the sheet.

The large-size printer generally performs borderless printing on roll paper (roll-like recording medium). Accordingly, both the printer driver and the printer hold a list of roll paper widths enabling borderless printing. Properly exchanging print data based on the roll paper width can obtain a printout without any borders on the upper, lower, left, and right sides. Note that in this embodiment, printing without any borders on the upper, lower, left, and right sides of an output sheet as described above will be referred to as "four-side borderless" printing. FIG. 15A shows the result obtained by four-side borderless printing.

Referring to FIG. 15A, the printer performs borderless printing without any borders on the left and right ends (the two ends in the widthwise direction) and the lower end (leading end) of roll paper and then cuts the paper at the cut position indicated by the dotted line with a cutter provided for the printer, thereby obtaining a four-side borderless printout without any border either on the upper end (trailing end). That is, "four-side borderless" printing is printing without any borders on the two ends in the widthwise direction of roll paper, and is printing without any borders on the four sides while the roll paper is cut at a print trailing end.

The printer driver can add various types of limitations to print settings so as to properly generate print data and allow the user to properly set borderless printing. For example, when the user sets borderless printing, the printer driver can prepare only sizes matching a roll paper width enabling borderless printing as an output sheet size to be displayed. The printer driver can also perform the processing of enabling the user to make settings without hesitation by automatically changing to a roll paper width for borderless printing in accordance with a set output sheet size. In addition, the printer driver checks the combination of an output sheet size and a roll paper width when finalizing print settings. If the set combination contradicts borderless printing, the printer driver displays a warning screen to inhibit the user from finalizing the corresponding settings. This allows the printer driver to prompt the user to change to proper settings and prevent a printing failure.

In addition, if the output sheet size matches the roll paper width enabling borderless printing upon rotation of the image through 90°, the printer driver can transmit the generated image data to the printer at the time of printing by automatically rotating the imaged data. Providing limitations for settings so as to perform four-side borderless printing when performing borderless printing, the printer driver generates print data enabling borderless printing while allowing the user to easily make settings for borderless printing. Note that the printer obtains image data included in the print data received from the printer driver and information about a sheet used for printing from a print command. If the combination of the obtained sheet information and the roll paper width list held in the printer does not enable borderless printing, the printer displays a warning to prevent a printing failure.

The above borderless printing is required to allow the user to freely perform borderless printing without conscious awareness of a roll paper width as well as performing borderless printing on roll paper with a prescribed width. For example, performing borderless printing upon setting roll paper larger than print data on the printer will generate a printout having a margin left on only one of the right and left sides without any borders on the upper, lower, and left sides or the upper, lower, and right sides. In this embodiment, borderless printing having a margin left on only one side without any borders on the upper, lower, and left sides or the upper, lower, and right sides will be referred to as "three-side borderless" printing. FIG. 15B shows the result obtained by performing three-side borderless printing. Referring to FIG. 15B, the printer performs printing so as to have no margins (borders) on the right end (one end in the widthwise direction) and the lower end (leading end) of roll paper, with a border being provided on the left end (the other end in the widthwise direction), and then cuts the paper at the cut position indicated by the dotted line, thereby obtaining a three-side borderless printout without any borders on the upper end (trailing end), the lower end, and the right end. That is, "three-side borderless" printing is printing with a margin provided on one end of roll paper in the widthwise direction and no margin on the other end (borderless), and is printing without any borders on the three sides while the roll paper is cut at a print trailing end.

Note that the user can obtain a printout having an arbitrary size without any borders on the four sides by cutting marginal portions of the printout obtained by three-side borderless printing. A printer provided with a cutter that can cut roll paper in the lengthwise direction (a direction intersecting the widthwise direction) of the roll paper may cut a marginal portion on the right end in FIG. 15B with the cutter, and then cut the upper end with another cutter that cuts the roll paper in the widthwise direction.

Conventionally, a printer driver and a printer add limitations to settings for inhibiting borderless printing with reference to four-side borderless printing as described above, and hence cannot selectively execute three-side borderless printing and four-side borderless printing. In contrast to this, this embodiment provides a mechanism that enables printing upon switching to three-side borderless printing, without omitting the above processing at the time of four-side borderless printing.

The arrangements of a host computer installed with a printer driver and a printer will be described first, and then an example of each type of processing procedure. Note that the following arrangements and processing procedures are only exemplary, and the arrangements may be replaced partly, or sometimes entirely, by other arrangements. For example, two arrangement blocks and two method steps may be integrated into one arrangement block and one method step, or one arrangement block and one method step may be divided into a plurality of arrangement blocks and a plurality of method steps. In addition, several arrangement blocks and method steps may be omitted. Note that the following will describe an ink-jet printing system that executes printing by discharging ink onto roll paper or a sheet such as a cut sheet. However, this is not exhaustive. For example, a printing system based on an electrophotographic method or offset printing method may be used. In addition, the following discussion may be applied to an arbitrary recording system that records on a recording medium other than sheets.

(Arrangements of System and Apparatus)

FIG. 1 shows the arrangement of a printing system according to this embodiment. This printing system includes a host computer (host 1) and an ink-jet printer (to be referred to as a printer 2 hereinafter). As shown in FIG. 1, the host 1 and the printer 2 are connected to each other via a predetermined bidirectional interface 3 (for example, USB or TCP/IP). Note that the host 1 can be an arbitrary computer such as a personal computer (PC), smartphone, or PDA (personal digital assistant). The printer 2 may not be an ink-jet printer and can be an arbitrary recording apparatus that can record images and characters on an arbitrary recording medium.

The host 1 includes a main board 100 including a CPU 101, a keyboard (KB) 105, a display (DISPLAY) 107 such as an LCD, and an external storage device 109 such as a hard disk (HDD) or flexible disk (FDD). Note that the keyboard is only an example of an input device, and another type of input device may be used. In addition, the display is only an example of an output device, and another type of output device may be used. The main board 100 includes the CPU 101, a RAM 102, a ROM 103, a keyboard controller (KBC) 104, a display controller (DISPC) 106, a disk controller (DKC) 108, and a printer controller (PRTC) 110.

The CPU 101 comprehensively controls the respective constituent elements connected to a system bus 111 and executes various types of programs. The keyboard controller 104 controls input from input devices such as the keyboard 105 and a pointing device (not shown). The keyboard controller 104 is also called an operation unit or input unit. The display controller (DISPC) 106 controls display on the display 107 and information output control for audio output and the like to a loudspeaker (not shown). The RAM 102 is a storage device functioning as the main memory or work area of the CPU 101. The ROM 103 is a storage device that stores an operating system, programs for executing functions including a printer driver (to be described later) according to this embodiment, a boot program, various types of applications, a printer control command generation program, and the like. Note that the printer control command generation program will be referred to as a printer driver hereinafter. The disk controller 108 controls access to the external storage device 109 such as a hard disk or flexible Disk®. The printer controller 110 is connected to the printer 2 via the bidirectional interface 3 and controls communication processing of data and commands with the printer 2.

The printer 2 includes a printer controller 121, a printer engine 122, an operation panel 12, and a nonvolatile storage device 133, and is connected to the host 1 via the bidirectional interface 3. The nonvolatile storage device 133 includes either or both of a hard disk (HDD) 128 and an EEPROM 129. The nonvolatile storage device is sometimes called the nonvolatile memory. The printer controller 121 includes a CPU 124, a ROM 125, a RAM 126, an I/F controller (I/F C) 123, a disk controller (DKC) 127, an panel I/F (I/F P) 130, and an engine I/F (I/F E) 132. Note that I/F stands for interface. The CPU 124 executes various types of programs. The ROM 125 receives print image data and commands from the host 1 and stores programs for implementing optimal recording by controlling the printer engine 122 and various types of data. The RAM 126 is used as a work area for temporarily storing various types of data and various types of programs. The I/F controller 123 is connected to the host 1 via the bidirectional interface 3 and controls communication processing of data and commands with the host 1. The hard disk 128 stores large volumes of data such as data from the host 1 and attached information concerning the data. The EEPROM 129 stores, for example, information unique to a recording apparatus used in a recording operation. The disk controller 127 controls access to the nonvolatile storage device 133. The panel I/F 130 controls display on the operation panel 12 and input from the operation panel 12. The engine I/F 132 controls the printer engine 122 that implements optimal printing by directly controlling hardware.

FIG. 2 shows an example of the functional arrangement of each apparatus. The host 1 has a printer driver 201 as its function. The printer driver 201 has several functional units and an information storage unit. A user interface unit 202 provides a function for prompting the user to input print settings for the printer driver and accepting the input. The printer driver 201 displays a print setting screen on the display 107 based on an instruction to display a print setting screen from the operating system operating on the host 1. The user interface unit 202 internally holds information concerning the function of the printer 2 and displays a print setting screen based on the information. A print data generation unit 203 generates print data transmitted as a print job to the printer. The print data generation unit 203 converts document data prepared by the user (image data generated by the user) into print data in a data format that can be interpreted by the printer 2 in accordance with the print settings set by using the user interface unit 202, and also generates control commands for performing printer control. A print data transmitting unit 204 transmits the print data generated by the print data generation unit 203 to the printer 2. The printer driver according to this embodiment has a function that can set borderless printing (four-side borderless printing and three-side borderless printing) in addition to a general printing control function. The computer (host 1) installed with a printer driver serves as a printing control apparatus that can execute borderless printing according to this embodiment. Note that various types of processing concerning the borderless printing function will be described later.

The printer 2 includes the printer controller 121 and the printer engine 122. The printer controller 121 includes a print data receiving unit 209. The print data receiving unit 209 receives print data transmitted from the print data transmitting unit 204.

(Processing Procedure)

The following will separately describe several processing procedures associated with cases in which three-side borderless printing and four-side borderless printing can be selectively executed at the time of print setting, at the time of the finalization of print settings, and at the time of the execution of printing.

<At Time of Print Setting>

Figure 3:
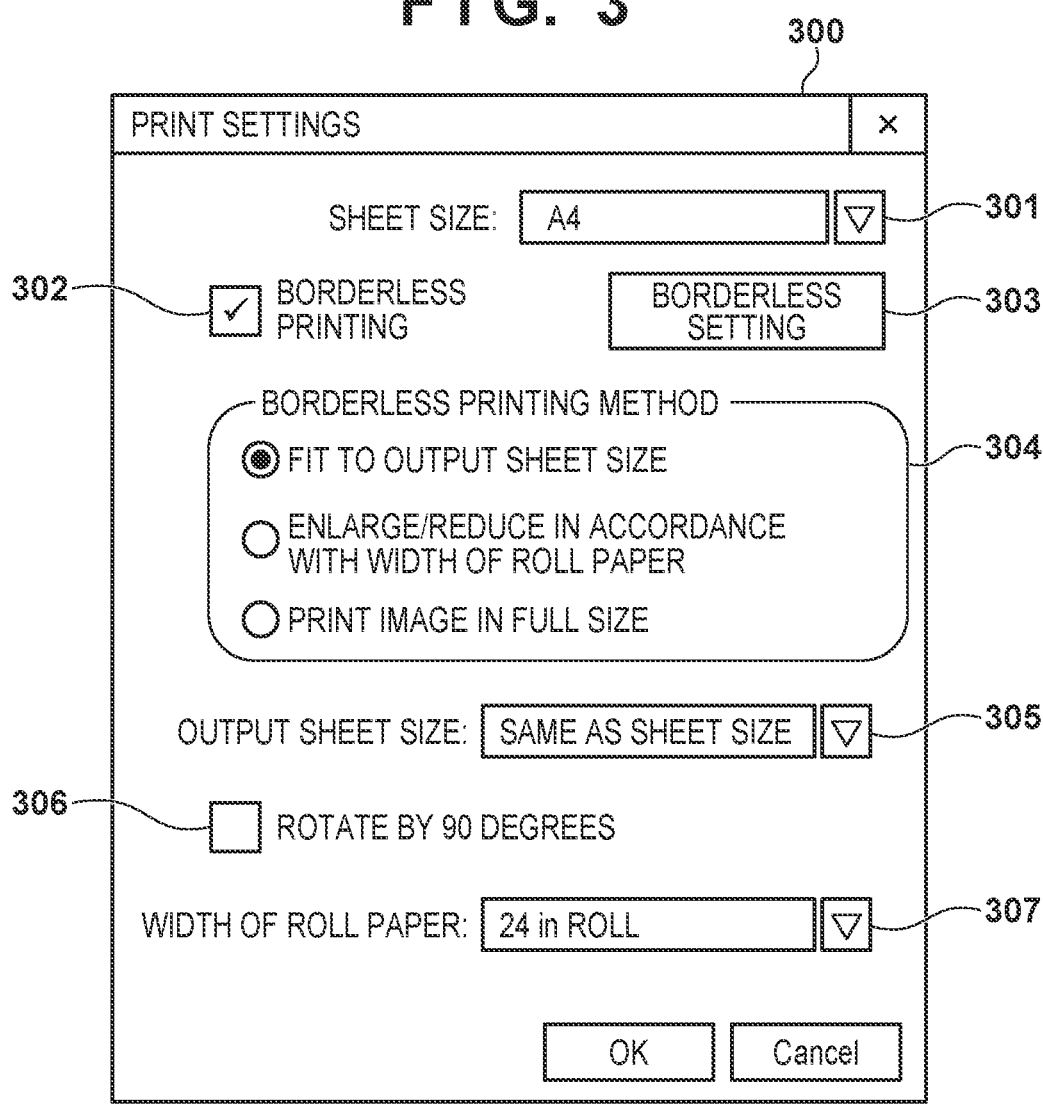
FIG. 3 is a view showing a screen example of a user interface which is generated by a printer driver.

FIG. 3 shows an example of a print setting screen 300 on which the user can operate at the time of print setting. The print setting screen 300 is displayed as the user interface of a printer driver. The print setting screen 300 is provided with check boxes, radio buttons, and dropdown lists as control items for allowing the user to designate print settings. "Sheet size" indicates a size associated with image data as a print target. This size is, for example, the sheet size set by a drawing application for creating image data. The user can create an image as a print target in this sheet size. When performing borderless printing, the user designates borderless printing by checking a "borderless printing" checkbox 302. Checking the "borderless printing" checkbox 302 will enable a "borderless setting" button 303 and three radio buttons 304 for designating options in "borderless printing method". The user can select a desired borderless printing method by operating these buttons. Note that when the "borderless printing" checkbox 302 is not checked, the radio buttons 304 may not be displayed or may be grayed out.

Figure 4:
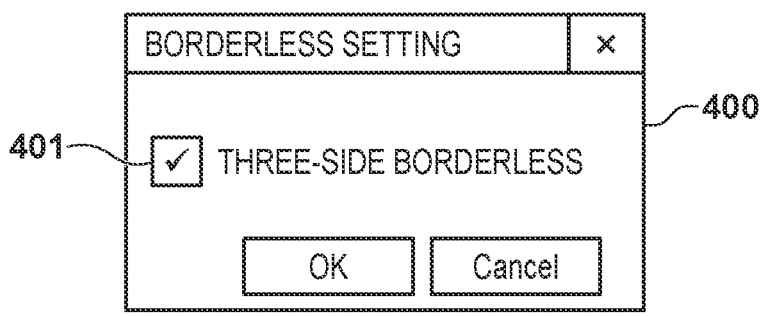
FIG. 4 is a view showing a screen example of a dialog for setting three-side borderless printing.

When the "borderless setting" button 303 is pressed, for example, a setting screen 400 (for example, a dialog box) like that shown in FIG. 4 is displayed. Although FIG. 4 shows an example of a screen including a checkbox 401 for switching settings between four-side borderless printing and three-side borderless printing, a screen including other setting information may be displayed. The screen in FIG. 4 may be displayed at a timing other than the timing when the "borderless setting" button 303 is pressed. In addition, setting items shown in FIG. 4 may be added to another screen such as the screen shown in FIG. 3. The checkbox 401 is checked when three-side borderless printing is performed, and is un-checked when four-side borderless printing is performed.

The option "fit to output sheet size" of the options in "borderless printing method" on the print setting screen 300 in FIG. 3 is a setting for performing borderless printing in accordance with the output sheet size selected with an "output sheet size" dropdown list 305. The option "print image in full size" is a setting for performing borderless printing without enlarging/reducing a document sheet. The option "enlarge/reduce image in accordance with roll paper width" is a setting for performing borderless printing in accordance with the roll paper width selected with a "roll paper width" dropdown list 307.

Figure 5:
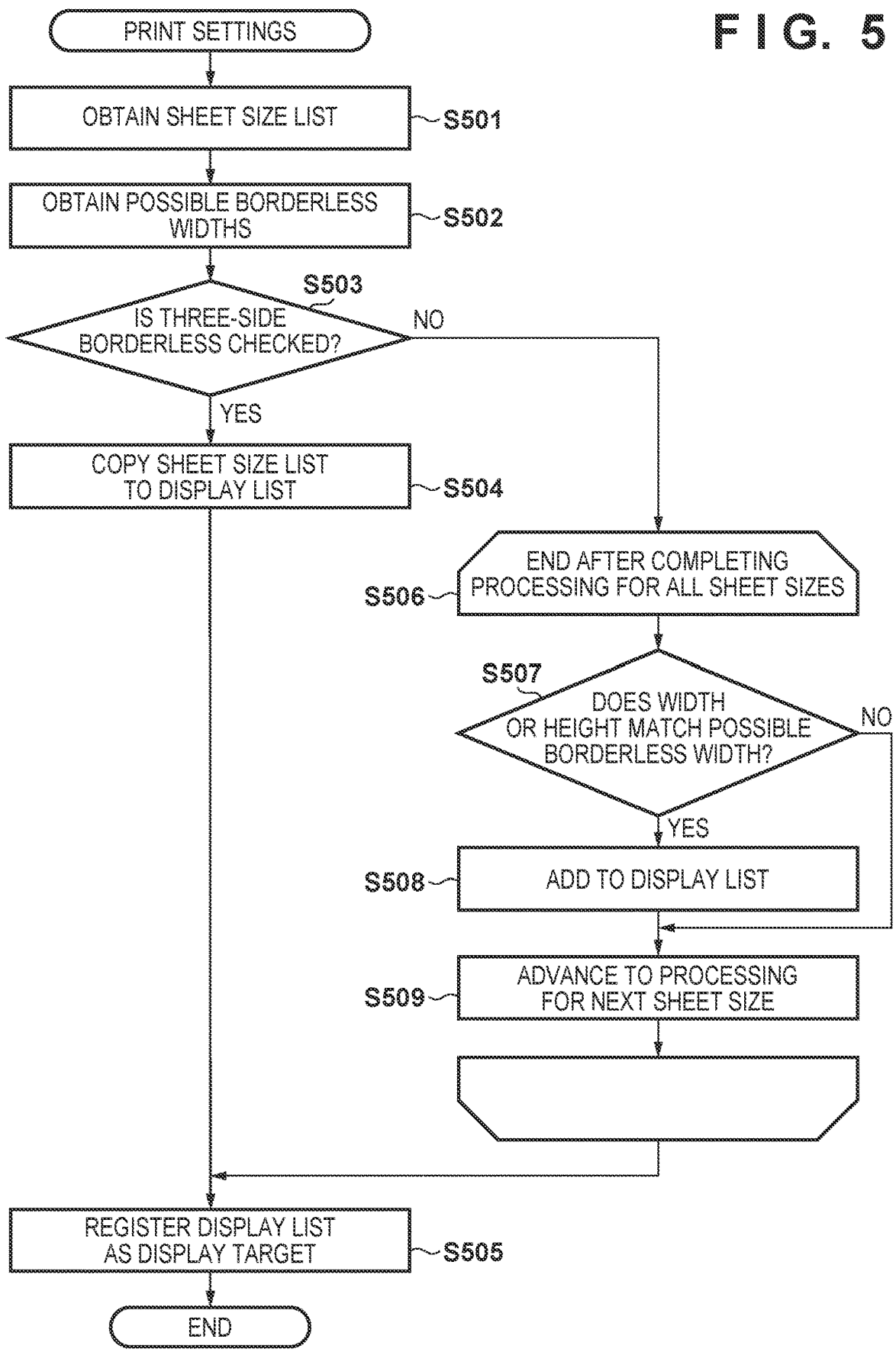
FIG. 5 is a flowchart showing an example of a processing procedure for limiting sheet sizes that can be selected at the time of print setting.

FIG. 5 shows an example of a processing procedure for limiting sheet sizes displayed in the "output sheet size" dropdown list 305 when "fit to output sheet size" is checked. First of all, the printer driver obtains a sheet size list like that shown in FIG. 6 and a possible borderless width list like that shown in FIG. 7 by reading data stored in the ROM 103 and the external storage device 109 in advance (steps S501 and S502). The sheet size list in FIG. 6 is a list of sheet sizes that can be set by the printer driver. The possible borderless width list in FIG. 7 is a list of sheet widths enabling the printer to execute borderless printing, and is determined for each printer.

The printer driver determines whether "three-side borderless" is checked on the screen 400 in FIG. 4 (step S503). If "three-side borderless" is checked (YES in step S503), all the sheet sizes included in the sheet size list are copied to the display list (step S504). The printer driver then registers the display list as sheet sizes to be displayed on the "output sheet size" dropdown list 305 (step S505), and terminates the processing.

If "three-side borderless" is not checked (NO in step S503), the printer driver advances the process to loop processing in step S506. In this loop processing, the printer driver repeatedly executes processing in steps S507 to S509 with respect to all the sheet sizes included in the sheet size list obtained in step S501. If, for example, the sheet size list in FIG. 6 is used, loop processing in step S506 can be sequentially executed, starting from ISO B3 at the head of the sheet size list, in the order of ISO B4, ISO A3, ISO A4, . . . . In step S507, the printer driver checks whether the width or length of a processing target sheet (ISO B3, ISO B4, ISO A3, ISO A4, and the like) matches the possible borderless width list. Upon determining that the width or length of the sheet matches the possible borderless width list (YES in step S507), the printer driver adds the sheet size to the display list (step S508). In contrast, upon determining that the width or length of the sheet does not match the possible borderless width list (NO in step S507), the printer driver does not add the sheet size to the display list. The printer driver then shifts the processing target to the next sheet size (step S509), and repeatedly executes processing in steps S507 to S509 until the end of processing with respect to all the sheet sizes in the sheet size list. The printer driver then registers the display list generated by this loop processing as sheet sizes to be displayed on the "output sheet size" dropdown list 305 (step S505), and terminates the processing.

In step S507, for example, because ISO B3 corresponds to a length of "5000" and the possible borderless width list in FIG. 7 includes "5000", the printer driver determines that the width or length of the sheet matches the possible borderless width list and adds ISO B3 to the display list. In contrast to this, because neither the width "2500" nor the length "3530" is included in the possible borderless width list in FIG. 7, the printer driver determines that the width or length of the sheet does not match the possible borderless width list, and does not add ISO B4 to the display list. When the numerical values in FIGS. 6 and 7 are used, loop processing in step S506 is executed in this manner to add ISO B3, ISO A3, and ISO A4 to the display list but does not add ISO B4 to the display list.

As described above, executing the processing in FIG. 5 will display all the sheet sizes held as a sheet size list that can be set by the printer driver when performing three-side borderless printing, and display only sheet sizes enabling borderless printing when performing four-side borderless printing. That is, the printer driver performs print setting such that limitations concerning sizes (for example, widths) of recording media (sheets) in four-side borderless printing are not applied to three-side borderless printing. In other words, even a recoding medium size that cannot be designated in four-side borderless printing can be designated at the time of print setting for three-side borderless printing. The printer driver can perform display switching processing so as to display proper sheet sizes in accordance with an operation mode in this manner.

Figure 8:
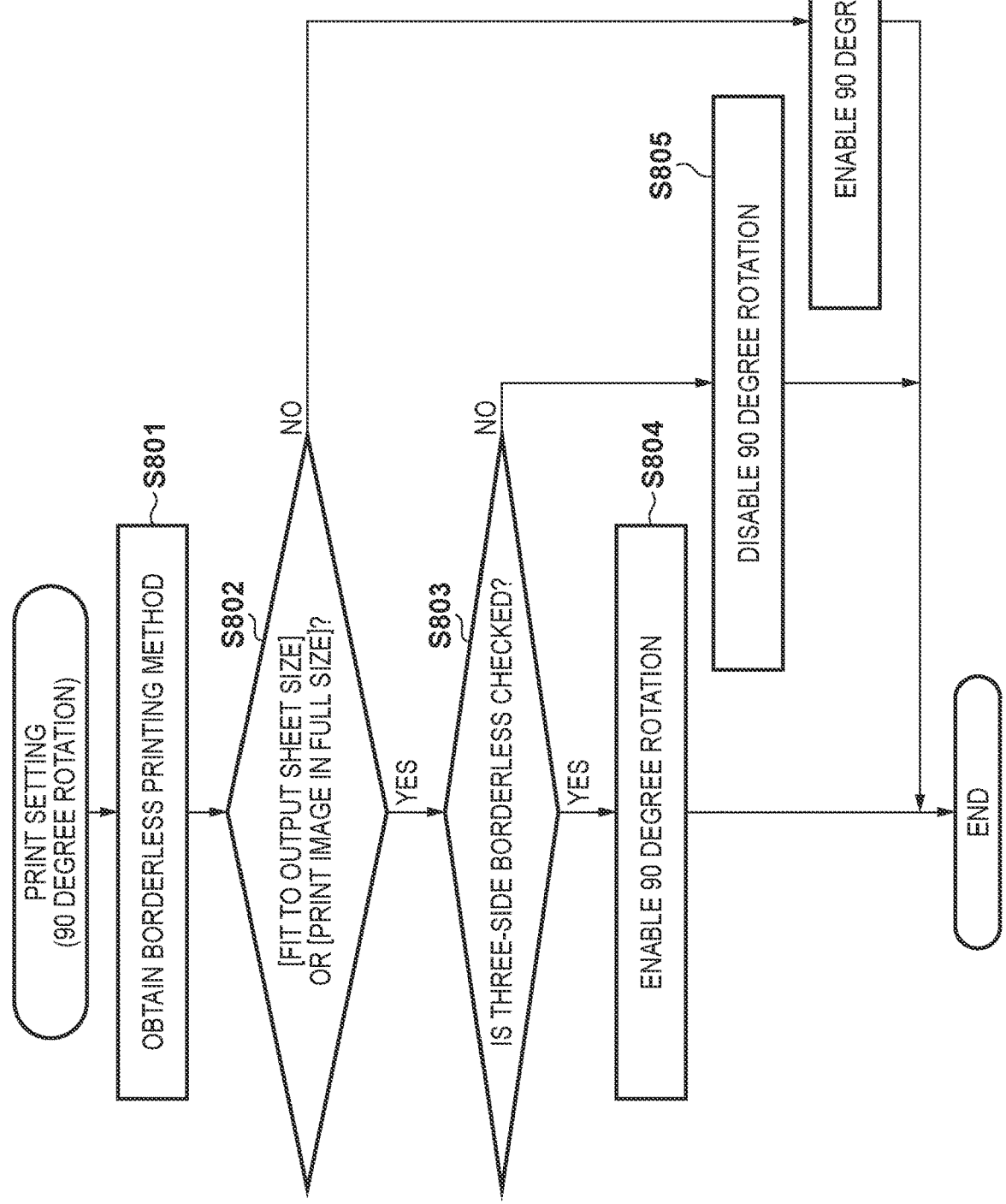
FIG. 8 is a flowchart showing an example of a procedure of enabling/disabling processing for a setting item concerning 90° rotation.

Referring back to FIG. 3, a "90° rotation" checkbox 306 is an item for accepting settings for printing of an image upon 90° rotation when checked. If, for example, sheet saving can be achieved by 90° rotation, the user uses this checkbox to issue an instruction to rotate an image through 90°. Note that "90° rotation" sometimes causes a trouble depending on partial settings when performing borderless printing. In this case, if the "90° rotation" checkbox 306 is kept enabled, unintentional setting may be made. For this reason, in this embodiment, the printer driver performs the processing of switching between control states in which "90° rotation" can be selected and cannot be selected at the time of borderless printing. FIG. 8 shows an example of this processing procedure. First of all, the printer driver obtains information indicating the setting selected in "borderless printing method" (step S801). The printer driver determines whether the setting is "fit to output sheet size" or "print image in full size" (step S802). Upon determining that the setting is one of them (YES in step S802), the printer driver determines whether the "three-side borderless" checkbox 401 is checked (step S803). If the "three-side borderless" checkbox 401 is checked (YES in step S803), the printer driver enables the setting item of "90° rotation" (step S804). If the "three-side borderless" checkbox 401 is not checked (NO in step S803), the printer driver disables the setting item of "90° rotation" (step S805). In this case, the printer driver may enable the automatic rotation function. Note that the "90° rotation" function is a function of forcibly rotating an image as a print target through 90° or 270° in accordance with an instruction (operation) from the user, and is different from the "automatic rotation" function of automatically rotating an image on the printer driver side in accordance with a sheet size. The automatic rotation function is a function of enabling the printer driver to automatically rotate an image through 90°. More specifically, for example, upon determining, based on the sheet size (image data size) selected on the setting screen in FIG. 3 and the width of an output sheet size, that the width of the sheet size does not match the width of the output sheet size and the height of the selected output sheet size matches the width of the output sheet size, the printer driver automatically rotates the image through 90° or 270°. In contrast, if the width of the sheet size does not match the width of the output sheet size, the printer driver does not automatically rotate the image. That is, in automatic rotation processing, the printer driver automatically determines, based on a sheet size and an output sheet size, whether to rotate an image. Note that if "enlarge/reduce image in accordance with roll paper width" is selected (NO in step S802), the printer driver enables the setting item of "90° rotation" (step S806). In this case, the image data after rotation is printed upon being enlarged/reduced in accordance with the width of roll paper.

In this embodiment, performing processing like that shown in FIG. 8 makes it possible to properly control enabling/disabling of the "90° rotation" function. That is, in the processing in FIG. 8, limitations concerning the rotation of an image by a user operation in four-side borderless printing are not applied to three-side borderless printing. That is, print setting is performed such that limitations concerning the rotation of an image in four-side borderless printing are not applied to three-side borderless printing. In other words, even settings concerning image rotation which cannot be made in four-side borderless printing can be made in three-side borderless printing. As described above, display switching processing can be performed so as to perform proper display in accordance with an operation mode.

<At Time of Print Setting Finalization>

Figure 9:
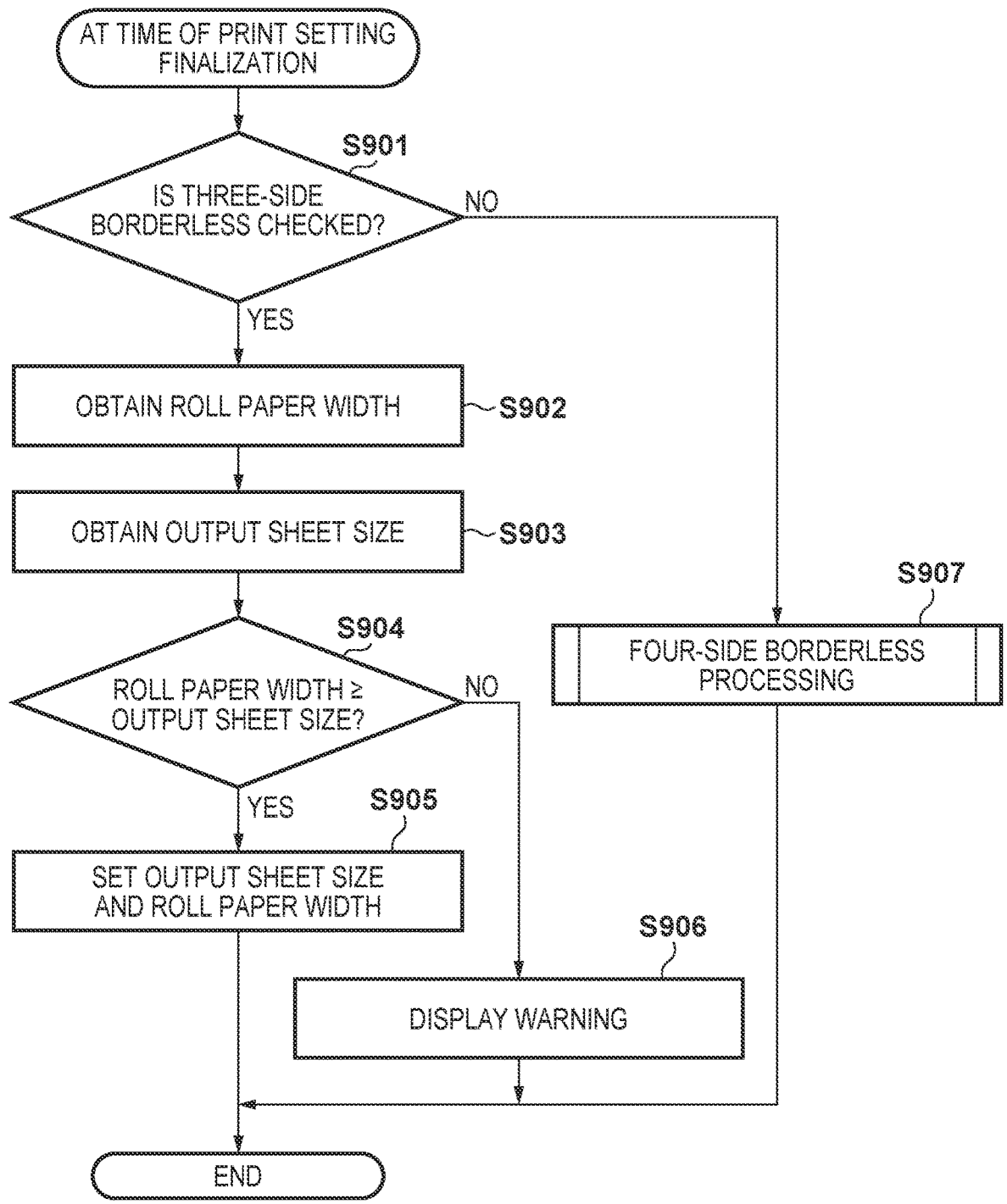
FIG. 9 is a flowchart showing an example of a processing procedure at the time of print setting.

For example, upon completing desired print settings on the screen in FIG. 3, the user presses the "OK" button to finalize the print settings. FIG. 9 shows an example of a processing procedure executed by the printer driver at the time of print setting finalization. First of all, the printer driver checks whether the three-side borderless checkbox 401 is checked (step S901). If the three-side borderless checkbox 401 is checked (YES in step S901), the printer driver obtains information about a set roll paper width (step S902). The printer driver also obtains information about a set output sheet size (step S903). The printer driver then compares the obtained roll paper width with the output sheet size (step S904). If the roll paper width is equal to or more than the output sheet size (YES in step S904), the printer driver can obtain a three-side borderless printout, and hence finalizes the output sheet size and roll paper width settings (step S905), thus terminating the processing. Note that at this time, the printer driver may display a message prompting to determine whether to finalize settings and make the user select whether to execute printing or change the settings. In contrast, if the roll paper width is smaller than the output sheet size (NO in step S904), the printer driver displays a warning because an image is sometimes clipped to result in a printing failure or an error occurs sometimes in the printer main body (step S906), thus terminating the processing. Note that the printer driver may display this warning screen to prompt the user to change the print settings again or may finalize the settings without any change while displaying a warning screen. If the three-side borderless checkbox 401 is not checked (NO in step S901), the printer driver executes four-side borderless processing (step S907), thus terminating the processing. At this time, the printer driver may display a message prompting to check whether to finalize the settings and make the user select whether to execute printing without any change or change the settings.

Figure 10:
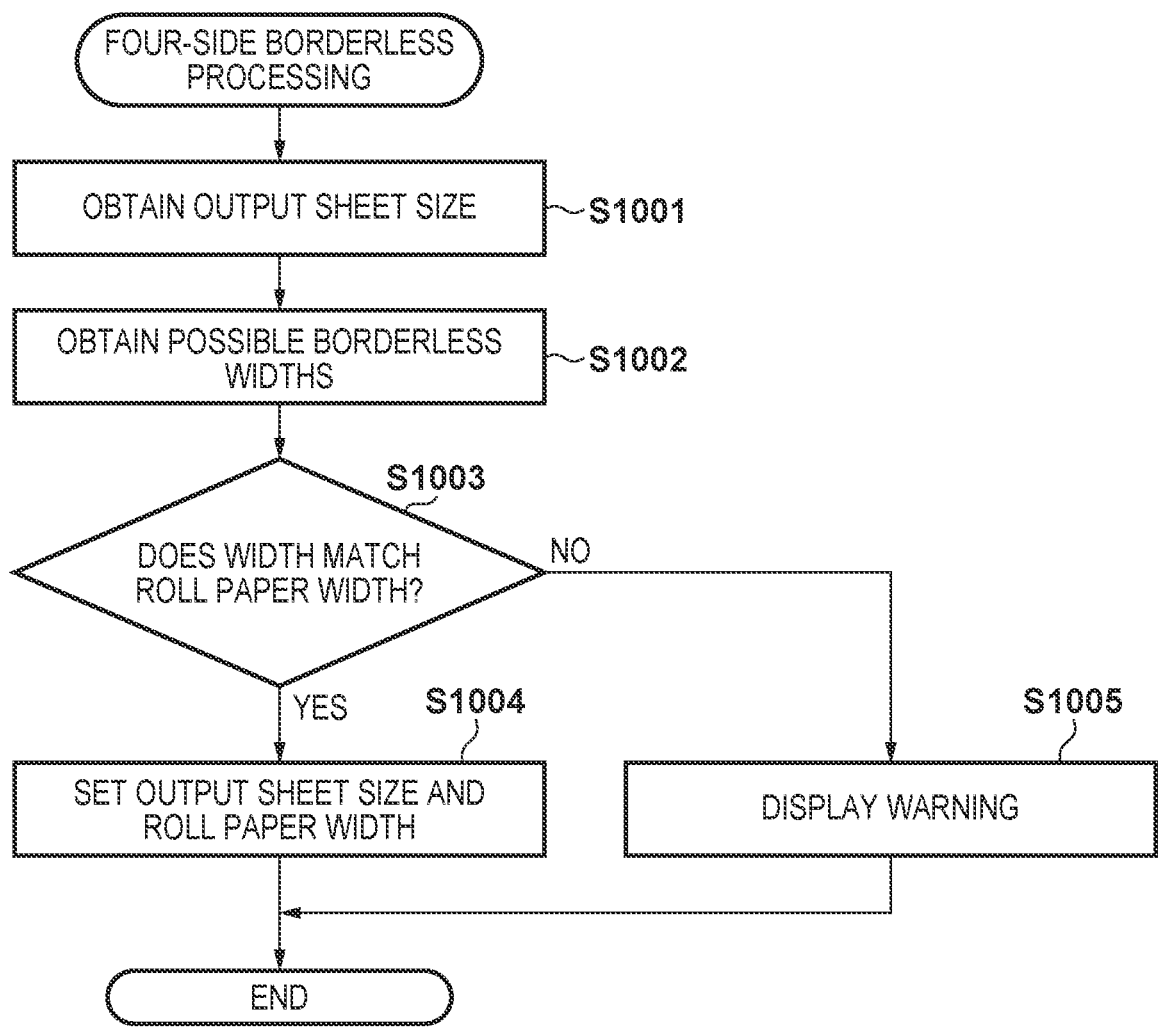
FIG. 10 is a flowchart showing a procedure of four-side borderless printing processing.

FIG. 10 shows the details of processing in step S907. The printer driver obtains a set output sheet size and a possible borderless width held in the driver (steps S1001 and S1002). The printer driver determines whether the obtained possible borderless width matches the output sheet size (step S1003). Upon determining that these widths match each other (YES in step S1003), the printer driver finalizes the output sheet size and roll paper width settings (step S1004), and terminates the processing. In contrast, if these widths do not match (NO in step S1003), because four-side borderless printing is not properly performed, the printer driver displays a warning (step S1005), and terminates the processing.

In this embodiment, performing processing like that shown in FIGS. 9 and 10 makes it possible to prevent the occurrence of failures in three-side borderless printing and four-side borderless printing while making it possible to switch between settings for three-side borderless printing and settings for four-side borderless printing.

<At Time of Execution of Printing>

Figure 11:
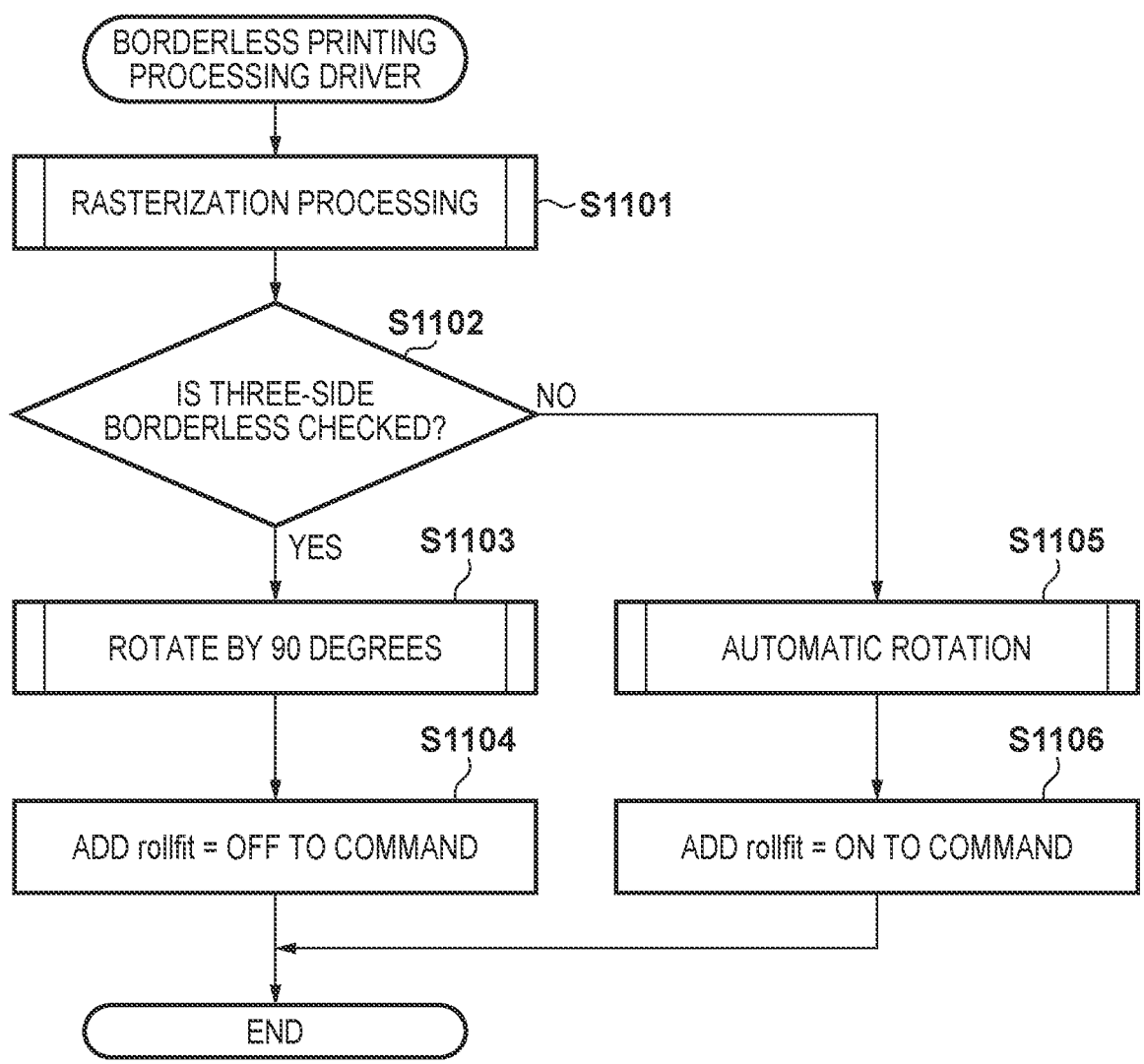
FIG. 11 is a flowchart showing an example of a printing processing procedure at the time of the execution of printing.

The user can input an instruction to execute printing from a drawing application after making desired settings via the user interface in FIG. 3. The printer driver executes print processing in accordance with acceptance of this instruction. FIG. 11 shows an example of a procedure of borderless printing processing. The printer driver creates image data in a raster format by performing rasterization based on a drawing instruction from a drawing application (step S1101). The printer driver checks the print settings to check whether three-side borderless printing is designated (step S1102). If three-side borderless printing is designated (YES in step S1102), the printer driver performs image rotation processing in accordance with "90° rotation" settings when the "90° rotation" settings are enabled (step S1103). The printer driver then adds rollfit=OFF to a command indicating that the image data does not fit to the roll paper width (step S1104), and terminates the print data generation processing. In contrast, if three-side borderless printing is not designated (NO in step S1102), the printer driver performs automatic rotation processing (step S1105) and adds rollfit=ON command to the print data (step S1106), thus terminating the print data generation processing. That is, if the above conditions for automatic rotation are satisfied, the printer driver automatically performs the processing of rotating the image through 90° or 270°. Note that the rollfit command is a command indicating that the image included in the print data matches the roll paper width. This embodiment exemplifies a case in which ON/OFF of the rollfit command is used as information discriminating three-side borderless printing from four-side borderless printing. That is, if rollfit=OFF, three-side borderless printing is allowed because the image data does not fit to the paper width. If rollfit=ON, it indicates that the image matches the roll paper width, and hence indicates four-side borderless printing. Note, however, that this embodiment may use any type of information as long as it discriminates three-side borderless printing from four-side borderless printing.

Figure 12:
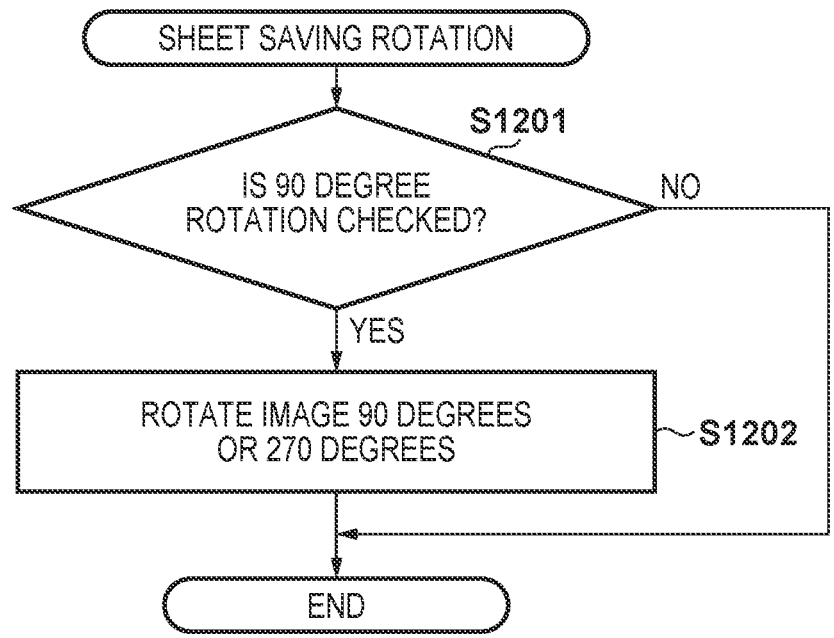
FIG. 12 is a flowchart showing an example of a procedure of 90° rotation processing.

FIG. 12 shows the details of processing in step S1103 in FIG. 11. In this processing, the printer driver checks whether the "90° rotation" checkbox 306 is checked (step S1201). If the "90° rotation" checkbox 306 is checked (YES in step S1201), the printer driver rotates the image through 90° or 270° (step S1202). If the "90° rotation" checkbox 306 is not checked (NO in step S1201), the printer driver terminates the processing without performing any operation.

Figure 13:
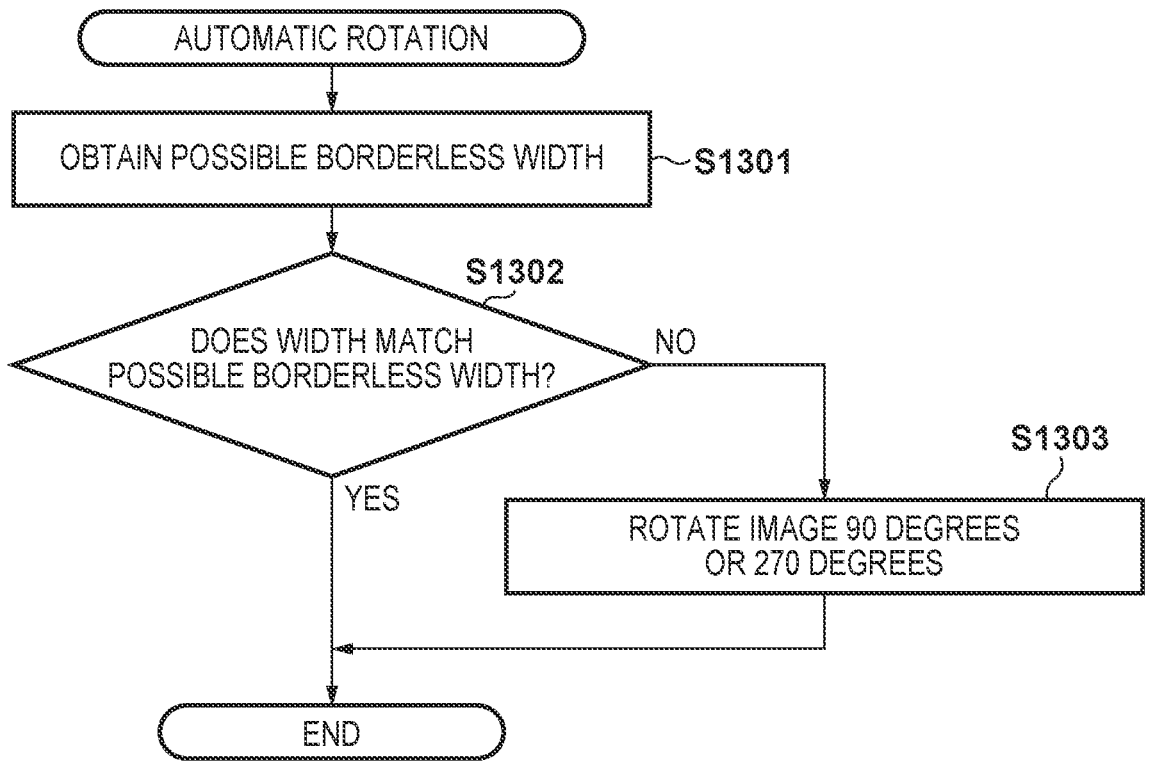
FIG. 13 is a flowchart showing an example of a procedure of automatic rotation processing.

FIG. 13 shows the details of processing in step S1105 in FIG. 11. First of all, the printer driver obtains the possible borderless width held by itself (step S1301). The printer driver then compares the width of image data with the possible borderless width (step S1302). If the width of image data matches the possible borderless width (YES in step S1302), the printer driver terminates the processing without performing any operation. In contrast, if the width of image data does not match the possible borderless width (NO in step S1302), the printer driver rotates the image through 90° or 270° (step S1303), and terminates the processing. Note that a case in which the width of image data does not match a possible borderless width in step S1302 appears when the height of the image data matches the possible borderless width.

Referring to FIGS. 11 to 13, it is possible to generate print data including a proper command for causing the printing apparatus to execute proper printing in accordance with the ability to switch print processing between three-side borderless printing and four-side borderless printing.

FIG. 14 shows an example of a processing procedure executed in the printer main body after print data is received from the printer driver. First of all, the printer obtains the width information of fed roll paper (the width information of roll paper held by the printer) and print data (steps S1401 and S1402). At this time, the printer obtains information about the width of the sheet size included in the print data and information about the rollfit command. Subsequently, the printer checks whether the set value of the rollfit command is set to ON (step S1403). If the rollfit command is set to ON (YES in step S1403), the printer determines whether the width of the fed roll paper matches the width of the sheet size included in the print data (step S1404). If these widths match each other (YES in step S1404), because four-side borderless printing can be performed, the printer executes four-side borderless printing (step S1405) and terminates the processing. If these widths do not match (NO in step S1404), because four-side borderless printing is not performed, the printer displays an error without performing printing or temporarily stops printing and notifies the user that the processing cannot be continued (step S1406). The printer then terminates the processing. If the rollfit command is not set to ON (NO in step S1403), because three-side borderless printing can be performed, the printer executes three-side borderless printing (step S1407) and terminates the processing.

By performing processing like that shown in FIG. 14, the printer can execute print processing while switching between three-side borderless printing and four-side borderless printing. If four-side borderless printing is set, the printer can execute four-side borderless printing while preventing a printing failure of forming a border.

According to the above processing example, a rollfit command is used to discriminate three-side borderless printing from four-side borderless printing based on the premise that borderless printing is performed. However, this is not exhaustive. For example, a rollfit command may be configured to hold a value indicating that borderless printing is not performed. That is, a rollfit command may be configured to discriminate between three printing modes including three-side borderless printing, four-side borderless printing, and borderless printing. In addition, a rollfit command may be combined with another type of command to discriminate between these three printing modes.

According to the present invention, it is possible to improve convenience in borderless printing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034741, filed Feb. 27, 2019, which is hereby incorporated by reference herein in its entirety.

What is claimed is:

1. A control method executed by a printing control apparatus capable of communicating with a printing apparatus that executes printing on a roll-like recording medium, the method comprising:

causing a display unit to display a setting screen capable of accepting a user instruction for selectively instructing a first printing mode or a second printing mode, wherein the first printing mode indicates four-side borderless printing that makes no margin on both sides in a widthwise direction of the recording medium and makes, by cutting the recording medium, no margin on both sides in a lengthwise direction of the recording medium, and wherein the second printing mode indicates three-side borderless printing that makes a margin on one side in the widthwise direction of the recording medium and no margin on another side in the widthwise direction of the recording medium and makes, by cutting the recording medium, no margin on both sides in the lengthwise direction of the recording medium, and wherein in a case where the first printing mode is instructed on the setting screen, a first print setting is not able to be set by a user, and in a case where the second printing mode is instructed on the setting screen, the first print setting is able to be set by a user.

2. The method according to claim 1, wherein the setting screen includes a control item capable of accepting a user operation concerning whether to execute the second printing mode, and makes the control item accept the instruction.

3. The method according to claim 2, wherein the first printing mode or the second printing mode can be instructed on the setting screen in a case where borderless printing is instructed.

4. The method according to claim 1, wherein in a case where the second printing mode is instructed on the setting screen, a size of the recording medium that cannot be designated in the first printing mode, as the first print setting, can be designated in the second printing mode.

5. The method according to claim 1, wherein the method comprises displaying a control item capable of accepting a user instruction concerning whether to print image upon rotating the image.

6. The method according to claim 5, wherein in the first printing mode, a user instruction concerning whether to print image upon rotating the image is not accepted, and in the second printing mode, a user instruction concerning whether to print image upon rotating the image can be accepted.

7. The method according to claim 1, wherein the method comprises displaying, in a case where the second printing mode is instructed on the setting screen, a warning screen in a case where a size of an image to be output exceeds a size of the recording medium to be used.

8. The method according to claim 1, wherein the method comprises generating print data including a command indicating that a size of an image to be printed does not match a size of a recording medium in a case where the second printing mode is instructed on the setting screen, and generating print data including a command indicating that a size of an image to be printed matches a size of a recording medium in a case where the first printing mode is instructed on the setting screen.

9. The method according to claim 1, wherein the method comprises outputting information indicating which one of the first printing mode and the second printing mode is instructed on the setting screen.

10. A printing control apparatus comprising:

at least one processor causing the printing control apparatus to:

cause a display unit to display a setting screen capable of accepting a user instruction for selectively instructing a first printing mode or a second printing mode, wherein the first printing mode indicates four-side borderless printing that makes no margin on both sides in a widthwise direction of the recording medium and makes, by cutting the recording medium, no margin on both sides in a lengthwise direction of the recording medium, and wherein the second printing mode indicates three-side borderless printing that makes a margin on one side in the widthwise direction of the recording medium and no margin on another side of the widthwise direction of the recording medium and makes, by cutting the recording medium, no margin on both sides of the lengthwise direction of the recording medium, wherein in a case where the first printing mode is instructed on the setting screen, a first print setting is not able to be set by a user, and in a case where the second printing mode is instructed on the setting screen, the first print setting is able to be set by a user.

11. The apparatus according to claim 10, wherein the setting screen includes a control item capable of accepting a user operation concerning whether to execute the second printing mode, and makes the control item accept the instruction.

12. The apparatus according to claim 11, wherein the first printing mode or the second printing mode can be instructed on the setting screen in a case where borderless printing is instructed.

13. The apparatus according to claim 10, wherein in a case where the second printing mode is instructed on the setting screen, a size of the recording medium that cannot be designated in the first printing mode, as the first print setting, can be designated in the second printing mode.

14. The apparatus according to claim 10, wherein the at least one processor further causes the printing control apparatus to display a control item capable of accepting a user instruction concerning whether to print image upon rotating the image.

15. The apparatus according to claim 14, wherein in the first printing mode, a user instruction concerning whether to print image upon rotating the image is not accepted, and in the second printing mode, a user instruction concerning whether to print image upon rotating the image can be accepted.

16. The apparatus according to claim 10, wherein in a case where the second printing mode is instructed on the setting screen, the at least one processor causes the printing control apparatus to display a warning screen in a case where a size of an image to be output exceeds a size of the recording medium to be used.

17. The apparatus according to claim 10, wherein the at least one processor further causes the printing control apparatus to generate print data including a command indicating that a size of an image to be printed does not match a size of a recording medium in a case where the second printing mode is instructed on the setting screen, and to generate print data including a command indicating that a size of an image to be printed matches a size of a recording medium in a case where the first printing mode is instructed on the setting screen.

18. The apparatus according to claim 10, wherein the at least one processor further causes the printing control apparatus to output information indicating which one of the first printing mode and the second printing mode is instructed on the setting screen.

* * * * *